United States Patent [19]

Myers et al.

[11] Patent Number: 4,872,736
[45] Date of Patent: Oct. 10, 1989

[54] CONNECTOR ASSEMBLY HAVING A LATCHING MECHANISM

[75] Inventors: Clyde J. Myers, Stone Mountain; Daniel L. Stephenson, Norcross; Ruben Travieso, Duluth, all of Ga.

[73] Assignee: American Telephone and Telegraph Company, AT&T Bell Laboratories, Murray Hill, N.J.

[21] Appl. No.: 183,194

[22] Filed: Apr. 19, 1988

[51] Int. Cl.[4] ............................................. G02B 6/36
[52] U.S. Cl. ............................... 350/96.20; 350/96.21; 439/350; 439/353; 439/577
[58] Field of Search ............... 350/96.20, 96.21, 96.22; 439/310, 350, 351, 353, 357, 289, 290; 250/227; 250/227

[56] References Cited

U.S. PATENT DOCUMENTS

| | | | |
|---|---|---|---|
| 3,133,777 | 5/1964 | Anhalt | 439/350 X |
| 4,427,879 | 1/1984 | Becher et al. | 350/96.20 |
| 4,611,887 | 9/1986 | Glover et al. | 350/96.21 |
| 4,634,214 | 1/1987 | Cannon, Jr. et al. | 350/96.20 |
| 4,645,295 | 2/1987 | Pronovost | 350/96.20 |
| 4,657,340 | 4/1987 | Tanaka et al. | 350/96.20 |
| 4,696,540 | 9/1987 | Adams et al. | 350/96.20 |
| 4,747,656 | 5/1988 | Miyahara et al. | 350/96.20 |
| 4,762,388 | 8/1988 | Tanaka et al. | 350/96.20 |
| 4,787,706 | 11/1988 | Cannon, Jr. et al. | 350/96.20 |
| 4,798,440 | 1/1989 | Hoffer et al. | 350/96.20 |

FOREIGN PATENT DOCUMENTS

| | | | |
|---|---|---|---|
| 0147231 | 7/1985 | European Pat. Off. | 350/96.21 X |
| 0177937 | 4/1986 | European Pat. Off. | 350/96.21 X |
| 609494 | 2/1979 | Switzerland | 439/350 |

OTHER PUBLICATIONS

Uberacher, "Optical Connector", IBM Tech. Discl. Bull., vol. 25, No. 11B, 4/83, pp. 6282–6283.

Primary Examiner—William L. Sikes
Assistant Examiner—Brian M. Healy
Attorney, Agent, or Firm—Edward W. Somers

[57] ABSTRACT

A connector body (26) which terminates at least one transmission medium includes on each side thereof a cantilevered arm (66) having a latching nub (70) projecting from a free end of the arm. A release cover (80) having a gripping portion (88) oriented toward a cable input end (32) of the connector body is mounted slidably on the connector body with the latching nubs of the arms each projecting through a window (90) in the cover. Conductors in the connector body are connected to conductors of another connector or of a device by inserting the connector body and release cover into a coupling (100) or into a receptacle. The latching nubs of the arms protrude into openings (106—106) provided in a housing (102) of the coupling to secure the connector body thereto. In order to withdraw the connector body from the coupling, a user moves the cover slidably along the connector body toward the cable input end. Walls which define the windows of the cover cam against the latching nubs causing them to be depressed as the free ends of the arms are moved inwardly. Once the nubs have cleared the openings in the coupling or in the receptacle, the connector body and release cover may be withdrawn from the housing. The release cover also is effective when forces of a predetermined magnitude are applied to the connector body to cause the latching nubs to become disengaged from the coupling and allow withdrawal of the connector body therefrom.

17 Claims, 5 Drawing Sheets

CONNECTOR ASSEMBLY HAVING A LATCHING MECHANISM

TECHNICAL FIELD

This invention relates to a connector assembly having a latching mechanism. More particularly, it relates to a latching mechanism for holding an optical fiber connector juxtaposed to another connector or to a device and for allowing withdrawal of the connector from such juxtaposition upon the application of forces of a predetermined magnitude to portions of the connector assembly.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, or to interconnect computer networks, for example.

In order to assure that the low loss optical fibers which are produced today are not diminished in their effectiveness in systems, the fibers must be connected through intermateable connectors which preserve those low losses. A connector which is disclosed in U.S. Pat. No. 4,634,214 which issued on Jan. 6, 1987 in the names of T. C. Cannon, et al. is used to connect single optical fibers. In it, a cylindrically shaped plug terminates a single optical fiber and is adapted to be received in a coupling and adjacent to the plug of another such connector which terminates another single optical fiber.

As the optical fiber art has matured, efforts have been made to provide a connector which embodies enhanced features. The sought-after connective arrangement may include a plug which includes a connector body and which is to be received in a receptacle or in a coupling. The receptacle may be mounted in equipment whereas the coupling may be used to extend the length of a cable which is terminated by the connector body.

Thought must be given to the ease of making the connection between one connector and a device or between the one connector and another connector. In this regard, the sought-after connector must be user-friendly, that is, it must be capable of being easily used by a person having a minimum level of experience.

In order to be user-friendly, the connective arrangement should be such that the elements of the arrangement are assembled with relatively low force. For example, the force required to insert a connector body into a coupling which is to join the connector body to another or to a device should not exceed a value of about two pounds. Otherwise, the user may believe that the assembly positions are incorrect and may seek other avenues to make the connection.

Not only must the connector be capable of being connected easily to another connector or to a device, it also must be capable of being disconnected easily therefrom. In the prior art, disconnection in some instances requires a manual search for buttons, for example, that must be depressed to allow withdrawal. In others, it is not uncommon to find that a tool such as a screwdriver may be required to effect disconnection.

Typically, an optical fiber connector terminates an optical fiber or an optical fiber cable which includes a strength member system. Forces may be inadvertently applied to the cable or cables. Hence, it is desired that the sought-after connector provide a measure of strain relief for the connecting elements. Provisions should be made for transferring any forces applied to the cable through the strength member system to a housing of the connector to avoid stressing the optical fibers and interrupting the connection. Also, it is desirable to include provisions to cause disconnection when the cable is subjected to a tensile force of a predetermined magnitude.

Of course, from the standpoint of cost and ease of assembly, the sought-after connector should embrace a minimum number of parts. Further, those parts should be easily assembled.

Seemingly, the prior art does not include such a connective arrangement. What is sought and what is not seemingly available is a connector body which includes a minimum number of elements, which is easily connected to a receptacle or to a coupling with minimum force levels and which is easily disconnected therefrom. Further, the sought-after connector should be one which includes provisions for disconnection of portions thereof when the cable is subjected to a tensile force of predetermined magnitude.

SUMMARY OF THE INVENTION

The foregoing problems of the prior art have been overcome with the connector assembly of this arrangement. A communications connector assembly includes a connector body which includes a first end and a second end and at least one connective device disposed adjacent to the first end. The second end is an input end for a communication path. The connector body also includes latching facilities. A cover is disposed about the connector body and is adapted to be moved slidably along the connector body. The assembly also includes a coupling for receiving at least a portion of the connector body and for aligning the connective device of the connector body with another communication path. The latching facilities are effective when the cover is in a first position to secure the connector body to the coupling. When the cover is moved to a second position or when the connector body is subjected to a force having a predetermined magnitude and direction, the cover cooperates with the latching facilities to cause the latching facilities to become disengaged from the coupling and allow withdrawal of the connector body from the coupling.

More particularly, the connector assembly which is used to interconnect at least one optical fiber cable with another light path includes a connector body which includes a connection end and a cable input end and at least one connective device disposed adjacent to the connection end. The connector body includes at least one latching portion which normally is biased outwardly from the connector body. Also, the connector assembly includes a release cover which is disposed slidably about the connector body and at least one window in one portion thereof to receive the latching portion. The release cover is adapted to be moved slidably by a user grasping the cover adjacent to the cable input end and moving it toward the cable thereby causing a wall which defines the window to cam along the latching portion to urge the latching portion inwardly. Further, the connector assembly includes a coupling for causing said connective device of the connector body to become connected to another light path. The coupling includes a housing adapted to receive the connector body and includes an opening therein so that when the connector body is received in the housing, the latching portion, which normally extends beyond the window, projects into the opening to secure the connector body to the coupling. When the release cover is moved slidably toward the cable input end, it depresses the latching portion to withdraw it from the opening in the housing to permit withdrawal of the connector body from the housing.

Provisions are made for allowing disconnection of portions of the connector assembly upon the application to the cable, for example, of tensile forces of a predetermined magnitude. A latching surface of the latching portion is inclined at a predetermined angle to a longitudinal axis of the connector. As a result, upon the application of tensile forces of at least a predetermined magnitude to the cable, a wall which partially defines the opening in the housing is caused to ride along the inclined portion of the latching portion and cause the latching portion to be moved inwardly. This allows the connector body to be pulled from the coupling without damage thereto.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
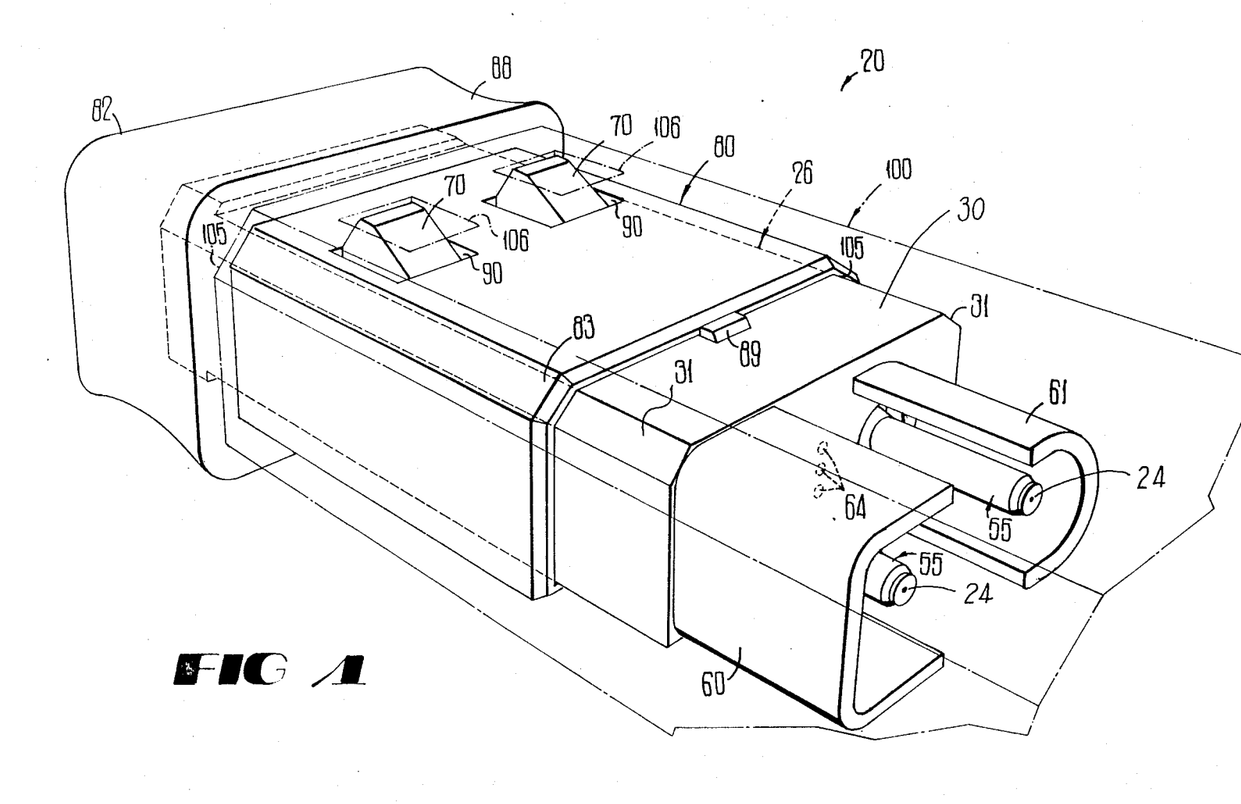
FIG. 1 is a perspective view of portions of a connector assembly with portions thereof broken away to show a connector body and release cover to be received in a coupling.

A connector assembly designated generally by the numeral 20 and shown in FIG. 1 is used to interconnect at least one optical fiber to another light path. Although the detailed description to follow is directed to an optical fiber connector, it should be understood that this invention also is applicable to a connector for copper conductors.

Figure 2:
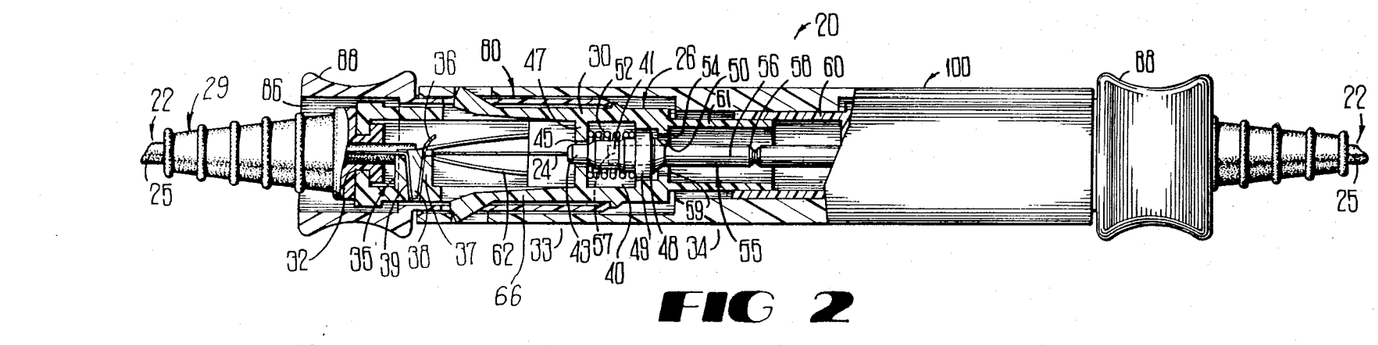
FIG. 2 is a side elevational view partially in section which shows connector bodies and a release cover of this invention received in a coupling.

In the embodiment shown in FIGS. 1 and 2, a jumper cable 22 which includes two optical fibers 24—24 and a jacket 25 is terminated by a connector body 26 for connection to two other light paths. The other light paths could be two other optical fibers 24—24 which are terminated by another connector body or in devices (not shown).

The connector body 26 includes a shell 30 (see FIGS. 1-2) having chamfered edge surfaces 31—31 and having a cable input end 32, a center portion 33 and a connection end 34. The optical fiber cable 22 enters the connector body 26 at its cable input end 32 through a bend limiter 29. The jacket 25 of the cable 22 is removed from an end portion thereof and the two individual fibers of the cable are routed past the center portion and are terminated at the connection end 34.

As is well known, jumper type cables include not only optical fiber and a jacket but also includes a strength system. A suitable strength system may include a strength member yarn 36 such as a KEVLAR ® yarn for imparting suitable tensile strength to the cable. When such a cable is terminated by the connector, the strength members must be terminated to transfer any forces imparted to the cable to the connector housing, for example, to avoid stressing the fiber connections.

The connector assembly of this invention includes facilities for terminating the strength member yarn. A pair of pedestals 35—35, one of which is shown in FIG. 2, are disposed within the connector body 26, the shell 30 of which itself may comprise two mating halves. Each pedestal 35 includes a base 37 and a clamp 38. After the jacket has been removed from a leading portion of the cable to expose the optical fiber, the yarn 36 associated with each half of the cable is routed over an associated pedestal and a clamp secured to the pedestal. The yarn is routed in a tortuous path between surfaces 39—39 and forces imparted to the cable are transferred through the pedestal and clamp arrangement to the connector body 26 and away from the connection end 34.

The connection end 34 includes two nests 40—40 each of which is adapted to hold facilities which terminates an optical fiber. Each of the nests 40—40 includes a barrel 41 having an end 43 (see FIG. 2) received in an opening 45 in a partition 47 which extends transversely across the shell 30. The barrel 41 also includes a second end 48 which includes a rectangular shoulder 49. The shoulder 49 is disposed within an opening 50 adjacent to the connection end 34 of the connector body 26.

A compression spring 52 is disposed concentrically about each barrel 41 and engages the partition 47 at its inner end and the shoulder 49 at its outer end. The spring 52 is effective to bias the shoulder 49 into engagement with a wall 54 of the connection end 34 of its connector body 26.

Each of the nests 40—40 is adapted to hold a ferrule 55 (see again FIGS. 1 and 2). The ferrule 55 includes a cylindrical portion 56 having one end portion 57 disposed in the barrel 41 and another end portion 58 which projects beyond an end face 59 of the connector body 26. An end of each fiber terminates in an end face of the end portion 58 of the ferrule.

Advantageously, each of the exposed end portions 58—58 of the ferrules is protected from damage. One of the ferrules is enclosed partially by a shield 60 and the other ferrule by a shield 61. As can be seen in the drawings, the shield 60 has a partially rectangular cross-sectional shape whereas the other, the shield 61, has a generally semi-circular shape. This arrangement polarizes the connector assembly 20. Further, when the connector body 26 is coupled to another such connector body and thereby insures that it must have a predetermined orientation before it is able to be inserted into another portion of the connector body, the shield 61 is mated with the inner surface of the shield 60 of the other connector body (see FIG. 2) and the shield 60 is adapted to have a shield 61 of the other received along an inner surface thereof.

Provisions also may be made for providing an electrical connection. Electrical conductors 62—62 (see FIG. 2) of the cable may be routed longitudinally along the shell 30 and be terminated in sockets 64—64 (see FIG. 1). The sockets 64—64 are adapted to receive pins (not shown) of another connector to establish an electrical connection.

The center portion 33 of the connector body includes provisions for securing the connector body to another portion of the connector assembly 20. As can best be seen in FIGS. 2 and 3, the connector body 26 includes on each of two opposite sides of the shell 30 two cantilevered arms 66—66 molded integrally with the shell. Each cantilevered arm 66 is connected at an end 68 to the shell 30 adjacent to its connection end 34 and has a free end 69. Of course, the cantilevered arm could be attached to the shell 30 adjacent to its cable input end 32. Further, the free end 69 of each arm is provided with a latching nub 70.

Each of the arms 66—66 is disposed within an opening 72 in the shell 30. Because each arm is cantilevered, it is capable of being turned about its end 68 to cause the latching nub 70 to be moved within the shell. Normally, each latching nub 70 is biased outwardly to the position shown in FIGS. 2 and 3 such that the latching nub projects beyond an outer surface of the shell.

Also, it should be observed that each latching nub 70 includes two sloping portions. As can be observed in FIG. 3, a first sloping portion, designated 74, is oriented toward the connection end 34 of the connector body. A second sloped portion, designated 76, is oriented toward the cable input end 32. It should be observed that the slope of the second portion 76 is substantially more steep than that of the portion 74.

The connector body 26 is adapted to be received in a release cover 80. As can be seen in FIGS. 1-2 and 3-7, the release cover 80 includes a cable input end 82, beveled side portions 83—83 and an open end 84. The cable input end 82 includes an opening 86 through which the cable 22 extends to the connector body 26. The release cover 80 is sized so that a connection end of the connector body 26 and the end portions 58—58 of the ferrules 55—55 extend beyond the open end 84.

When the release cover 80 is mounted on the connector body 26, the release cover is slidably movable with respect to the connector body. In order to facilitate such sliding movement, the release cover 80 is provided with a gripping portion 88 adjacent to the cable entry end. Movement of the release cover 80 toward the connection end 34 of the connector body 26 is limited by a boss 89.

The release cover 80 also includes provisions which cooperate with the cantilevered arms 66—66 and the latching nubs 70—70 of the connector body 26 to disassemble the connector body from other portions of the connector assembly 20. To this end, the release cover 80 includes four windows 90—90 (see FIGS. 1 and 3), two in each of two opposed sides of the cover. Each of the windows 90—90 is aligned with and is adapted to receive a latching nub 70 of an associated one of the cantilevered arms 66—66. With a latching nub 70 disposed in each of the windows 90—90 sliding motion of the release cover 80 toward the cable 22 causes engagement of a sloped wall 92 (see FIG. 3) which defines each window with the inclined portion 74 of the nub 70 which extends through that window. Continued motion of the release cover 80 toward the cable 22 cams the nub 70 and hence the free end of each cantilevered arm 66 inwardly of the shell 30. This motion becomes important to the disconnection of the connector assembly 20.

Figure 3:
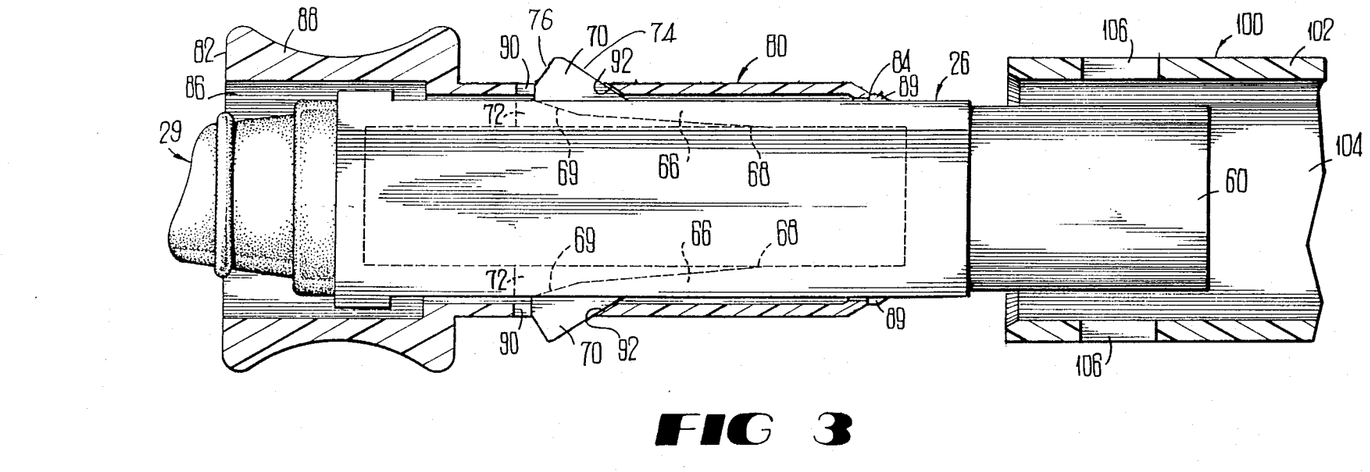
FIG. 3 is a side elevational view of a connector body and release cover about to be inserted into one end of the coupling.

Going now to FIGS. 1-3, there is shown a coupling designated generally by the numeral 100 which is used to couple together the connector body 26 with another connector body, for example. Of course, it should be understood that a receptacle (not shown) which may be attached to a printed circuit board, for example, and which couples the connector body to other optical devices could be used in other applications of the invention. Whatever is used is used to insert light paths for transmitting information.

The coupling 100 includes a housing 102 (see FIG. 3). The housing 102 includes a cavity 104 which is adapted to receive the connector body 26 and enclosing release cover 80. For the coupling 100, the housing 102 is aligned to receive portions of a connector body 26 and of a cover 80 in each end thereof whereas for a receptacle, a connector body and cover are received only in one end thereof. In order to assemble the connector body 26 with the coupling 100, the connector body is aligned with the coupling as is shown in FIG. 3. It should be noted that the connector body 26 is aligned with the housing 102 to cause the chamfered portions 31—31 of the connector body to be aligned with chamfered portions 105—105 (see FIG. 1) of the housing.

Figure 4:
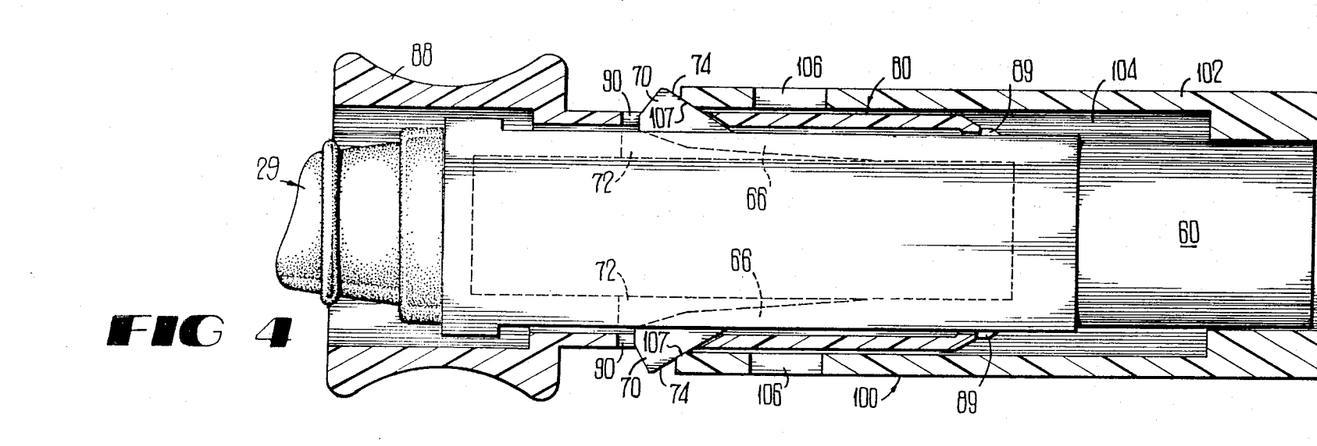
FIG. 4 is a side elevational view of the connector body of FIG. 3 after it has been inserted into an entry portion of the coupling.
Figure 5:
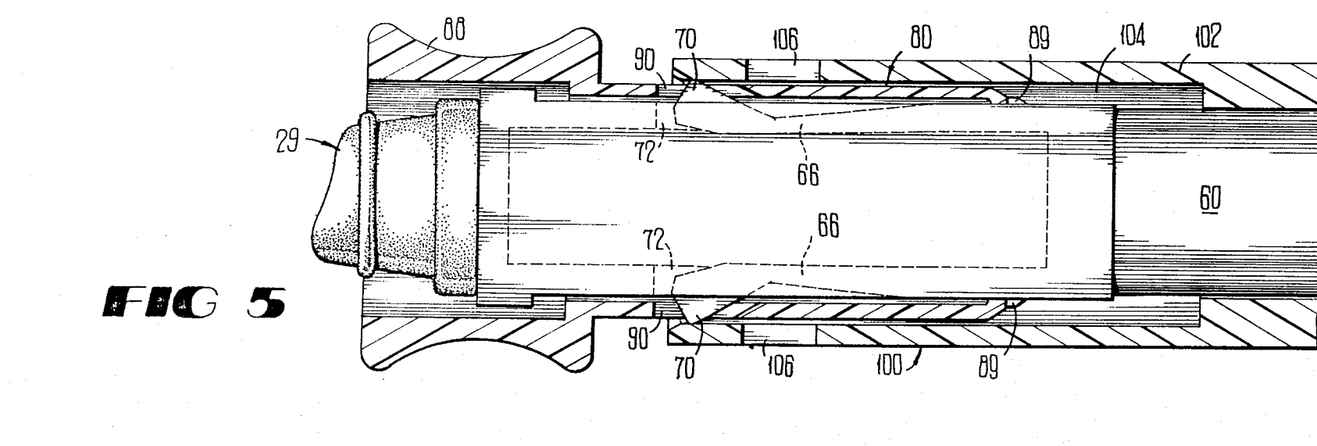
FIG. 5 is a side elevational view of the connector body and coupling at a further stage of the insertion.
Figure 6:
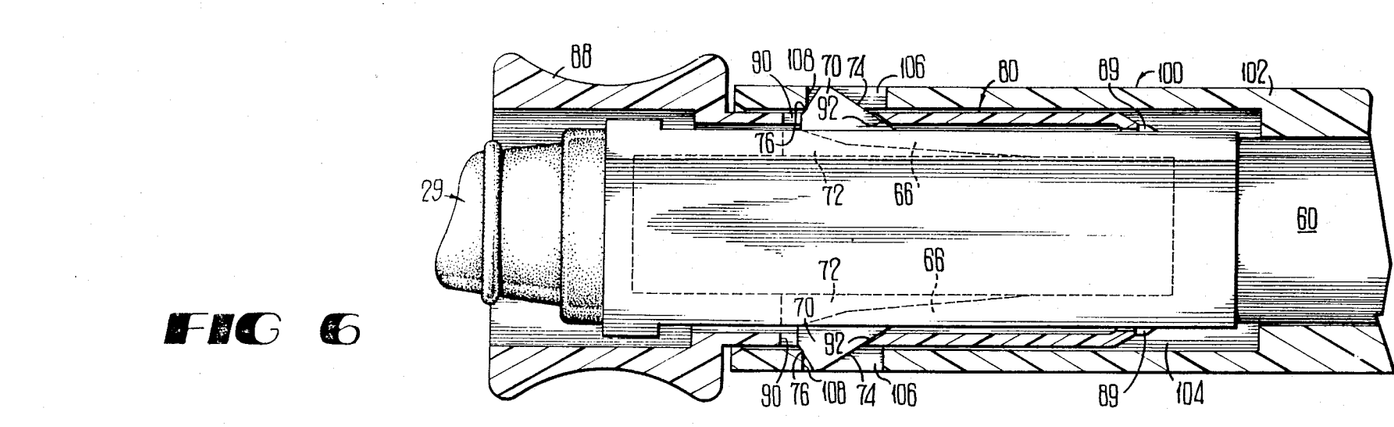
FIG. 6 is a side elevational view of the connector body and release cover after completed insertion into the coupling.

As the connector body 26 is inserted into the cavity 104 of the housing 102, the inclined portions 74—74 of the latching nubs 70—70 are engaged by an end surface 107 (see FIG. 4). Continued motion of the connector body 26 into the housing 102 causes each latching nub 70 to be depressed inwardly of the shell 30 (see FIG. 5).

Also, the coupling housing 102 includes four openings 106—106, two in each of two opposed sides. The openings 106—106 are situated so that they are aligned longitudinally with the cantilevered arms 66—66 and such that when the insertion of the connector body 26 into the cavity 104 has been completed, the latching nubs 70—70 which extend through the windows 90—90 in the release cover will project into the openings 106—106 (see FIG. 6). This disposition of the latching nubs in the openings is effective to cause the connector body to be secured within the housing.

As can be seen in FIG. 2, after two connector bodies 26—26 have been inserted into a coupling 100, the longitudinally aligned ferrules 55—55 thereof abut each other. At that time, the shoulder 49 of each barrel 41 is moved slightly from its associated wall 54.

Figure 7:
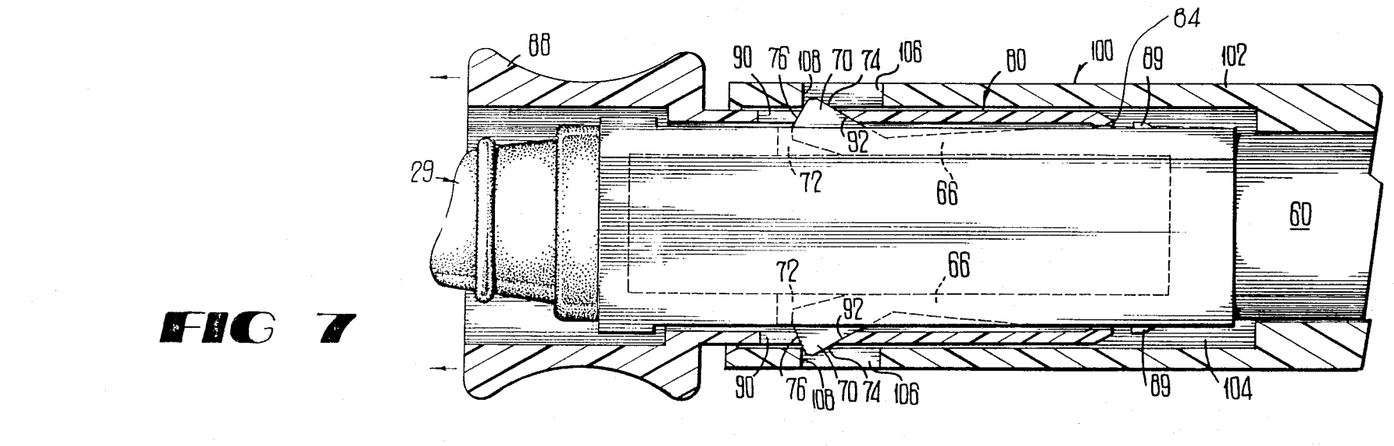
FIG. 7 is a side elevational view of the connector body and coupling as forces are applied to the connector body to withdraw the connector body and the release cover from the coupling cavity.

When it is desired to disconnect the connector body 26 from the housing 102, a user grasps the gripping portion 88 of the release cover 80 and pulls with force sufficient to cause the release cover to be moved toward the cable 22 (see FIG. 7). As described hereinbefore, this motion causes engagement of the walls 92—92 which define the windows 90—90 with the inclined portions 74—74 of associated ones of the latching nubs 70—70 and cams the latching nubs inwardly. As a result, the latching nubs 70—70 are withdrawn from the openings 106—106 in the housing 102 thereby allowing withdrawal of the connector body 26 from the cavity 104.

As long as pulling forces of at least a predetermined magnitude are not applied to the release cover 80, the cover is not moved and the connector body 26 remains disposed within the cavity 104. The latching nubs 70—70 within the openings 106—106 engage walls 108—108 which define the openings and prevent unintended withdrawal.

The disconnection of the connector body 26 is rendered effective upon the application of forces of at least a predetermined magnitude being applied to the release cover and being applied only in a predetermined direction. The magnitude of the forces required to facilitate disassembly by moving the release cover may be changed by varying the slope of the inclined portions 74—74 of the latching nubs 70—70 or the stiffness of the cantilevered arms 66—66 or both.

Advantageously, the connector assembly also includes a disconnect feature which is triggered upon the application of forces of at least a predetermined magnitude to the cable 22. When the connector body 26 and the cover 80 are disposed within the coupling housing 102, the engagement of a wall 108 of the opening 106 of the coupling housing with the second inclined portion 76 of each latching nub prevents withdrawal of the connector body from the coupling housing except upon the application of a tensile force of at least a predetermined magnitude to the cable 22 and hence to the connector body. The slope of the second portion 76 is simply too steep to allow relative motion between it and the wall 108 as forces are applied to the cable unless overcome by tensile forces of at least the predetermined magnitude. On the other hand, because of the lesser slope of the inclined portion 74 compared to the inclined portion 76, forces which are applied to the cover 80 in the direction of the cable input end 32 and which are sufficient to cause relative motion between a wall 92 and an inclined portion 74 typically are less than those required to be applied to the connector body to cause relative motion between a wall 108 and a surface 76 to cam the latching nub inwardly.

The connector assembly is arranged so that the application of tensile forces of at least a predetermined magnitude cause the connector body to be urged outwardly from the coupling and are sufficient, notwithstanding the relatively steep slope of the surface 76—76, to cause the walls 108—108 which define the openings 106—106 in the coupling housing 102 to cam against the surfaces 76—76. The slope of each surface 76 is such that when the predetermined magnitude is reached, the latching ability of those surfaces 76—76 is overcome and the connector body 26 is withdrawn from the cavity 104. The magnitude of the predetermined force which causes disconnection may be changed by varying the slope of each inclined portion 76 or the stiffness of the cantilevered arms 66—66 or both.

Figure 8:
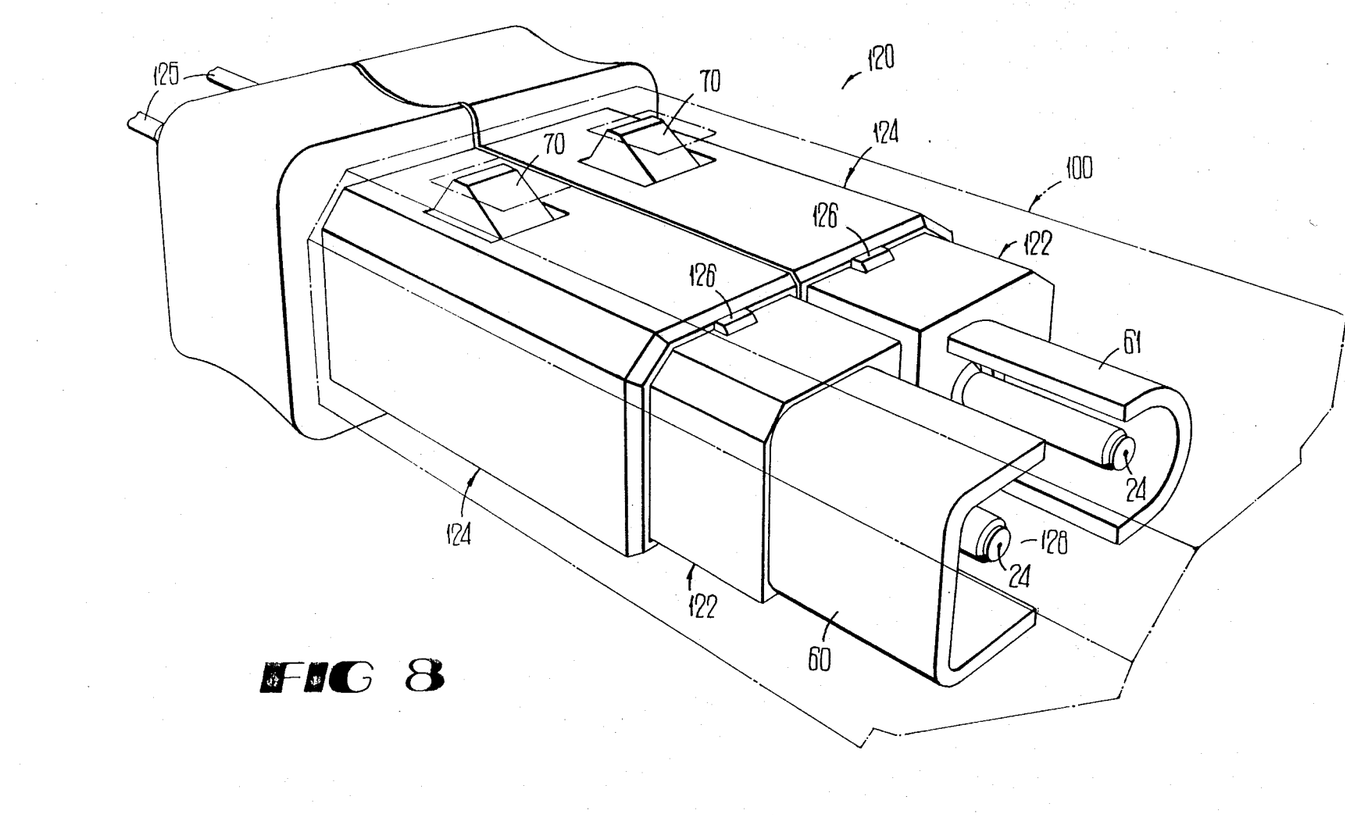
FIG. 8 is a perspective view of another embodiment of this invention.

Shown in FIG. 8 is a perspective view of a connector assembly 120 which includes two single fiber connector bodies 122—122 and associated release covers 124—124 adapted to be received in a coupling 100. As is seen in FIG. 8, each connector body 122 terminates a cable 125.

Each connector body 122 includes a latching nub 70 supported on a cantilevered arm (not shown) as in the connector assembly 20. A boss 126 is provided on each connector body 122 to limit the extent of travel of the release cover 124 toward a connection end 128 of the connector body. One of the connector bodies 122 is provided with a shield 60 and the other with a shield 61. When the connector bodies 122—122 are inserted into the coupling 100, the shields 60 and 61 are adapted to mate with shields 61 and 60, respectively, of another two connector bodies or with shields 61 and 60, respectively, of a single connector body 26 described hereinbefore. In this embodiment, each connector body 122 may be inserted and removed from the coupling 100 independently of the other.

It is to be understood that the above-described arrangements are simply illustrative of the invention. Other arrangements may be devised by those skilled in the art which will embody the principles of the invention and fall within the spirit and scope thereof.

What is claimed is:

1. A connector assembly, which includes:
    a connector body which includes a first end and a second end and at least one connective device disposed adjacent to said first end and adapted to terminate a communications path, said connector body including latching means;
    a cover which is disposed about said connector body and which is adapted to be moved slidably along said connector body; and
    a coupling for receiving at least a portion of said connector body and of said cover and for aligning said connective device of said connector body with another communication path, said latching means being effective when said cover is in a first position to secure said connector body to said coupling and cooperating with said cover as said cover is moved to a second position to cause said latching means to become disengaged from said coupling and allow withdrawal of said connector body from said coupling said latching means also cooperating with said cover to become disengaged from said coupling when said connector body is subjected to a force having a predetermined magnitude and being in a direction from said first end to said second end.

2. A communications connector assembly, which comprises:
    a connector body which includes a first end and a second end and at least one connective device disposed adjacent to said first end and which is adapted to terminate a communication media which includes a light path, said connector body including at least one movable latching portion which is biased outwardly therefrom and which includes a latching surface and a camming surface;
    a cover which is disposed about said connector body and which has at least one window in one portion thereof for allowing a portion of said movable latching portion to project outwardly therefrom, said cover being adapted to be moved slidably on said connector body to cause a wall which defines said window to engage and to be moved along said camming surface to move said latching portion inwardly within said window; and
    housing means for aligning said connective device of said connector body with another communication path, said housing means being adapted to receive at least a portion of said connector body and of said cover and including an opening therein so that when said connector body and cover are received in said housing means, said latching portion, which normally projects beyond said window, extends into said opening with said latching surface being engaged by a wall which defines said opening to secure said connector body within said housing means, and so that when said cover is moved in a direction toward said second end, relative motion is caused between said wall which defines said window and said camming surface to move said latching portion inwardly to withdraw it from said opening in said housing and thereby permit withdrawal of said connector body from said housing, said latching surface being inclined to a longitudinal axis of the connector assembly and being such that when a tensile force of at least a predetermined magnitude is applied to said connector body, relative engaging motion is caused between said latching surface and said wall which defines said opening to cause said latching portion to be moved inwardly and to withdraw said latching portion from said opening to allow withdrawal of said connector body from said housing.

3. The connector assembly of claim 2, wherein said latching portion comprises a latching nub having a sloping camming face, said nub being attached to a free end of a cantilevered arm and said cantilevered arm having an end opposite to said free end and attached to said connector body adjacent to said first end thereof, and wherein when said cover is moved toward said second end of said connector body, said wall which defines said window cams against said sloping camming surface of said latching nub to move said nub inwardly of said connector body.

4. The connector assembly of claim 4, wherein the magnitude of forces which need to be applied to said cover to move said cover or to the connector body to allow withdrawal of the connector body from the housing may be varied by changing the degree of slope of the camming surface and of the latching surface, respectively, or the stiffness of said cantilevered arm.

5. The connector assembly of claim 2, which includes two connector bodies, each adapted to terminate an optical fiber and each including a cantilevered arm on each of opposite sides thereof, each said arm having a latching portion attached to a free end thereof, and each of said two connector bodies adapted to be received in a release cover with the two release covers adapted to be received in a housing of a coupling having two openings in each of two opposed sides to receive the latching portions projecting from said cantilevered arms.

6. An optical fiber connector assembly, which comprises:
   a connector body which includes a connection end and a cable input end and two connective devices which are disposed adjacent to said connection end and each of which is adapted to terminate an optical fiber, said connector body including two latching nubs projecting and being biased normally outwardly therefrom, each said latching nub including a latching surface and a camming surface and being attached to a cantilevered arm which is formed integrally with said connector body,
   a release cover which is disposed slidably about said connector body and which includes at least two windows in one portion thereof for allowing a portion of each said latching nub to project outwardly therefrom, said release cover being adapted to be moved slidably by a user grasping said cover adjacent to said cable input end and moving it toward said cable input end thereby causing a wall which defines each said window to cam along one of the camming surfaces to urge said latching nubs inwardly and withdraw said nubs into said windows, said latching nubs normally extending beyond said windows; and
   a coupling for causing said connective devices of said connector body to become connected to other optical fibers, said coupling including a housing adapted to receive at least a portion of said connector body and of said cover and including at least two openings therein so that when said connector body is received in said housing, said latching nubs which extend beyond said windows project into said openings with said latching surfaces thereof being engaged by walls which define said openings to secure said release cover to said coupling, and such that when a force of at least a predetermined magnitude is applied to said release cover in a direction toward its cable end, said release cover is moved slidably to depress said latching nubs and to withdraw them from said openings in said housing to permit withdrawal of said connector body from said coupling.

7. The connector assembly of claim 6, wherein said connector body includes at least two cantilevered arms which are attached to said connector body with each said latching nub being attached to a free end of one of said arms.

8. The connector assembly of claim 7, wherein said cantilevered arms are attached to said connector body adjacent to said connection end, the free ends of said arms being oriented toward said cable input end of said connector body.

9. The connector assembly of claim 6, wherein said latching surfaces are inclined to a longitudinal axis of the connector assembly and are such that when a tensile force of at least a predetermined magnitude is applied to the connector body, relative motion is caused between said latching surfaces and said walls which define said openings to cause said latching nubs to be moved inwardly and withdraw said latching nubs from said openings to allow withdrawal of said connector body from said housing.

10. The connector assembly of claim 9, wherein the magnitude of the forces which need to be applied to said cover to move said cover or to said connector body to allow withdrawal of the connector body from the housing may be varied by changing the degree of slope of the camming surfaces or of the latching surfaces, respectively.

11. The connector assembly of claim 6, wherein said connector body includes means for terminating two optical fibers and said connector body includes a pair of cantilevered arms on each of two opposed sides thereof with a latching nub attached to the free end of each, and said housing including two openings on each of two opposed sides thereof.

12. The connector assembly of claim 6, wherein said connector body includes at least one chamfered edge extending longitudinally therealong and said housing of said coupling includes at least one sloping portion which joins a side portion and an adjoining portion so that said connector body must be oriented to align said chamfered edge thereof with said sloping portion of said housing before said connector body can be inserted into said housing.

13. The connector assembly of claim 6, wherein said cover also includes a gripping portion adjacent to said cable input end, said gripping portion adapted to be gripped by a user to move said cover toward said cable input end of said connector body and to move said connector body into a coupling.

14. The connector assembly of claim 6, wherein two ferrules each of which is adapted to terminate an optical fiber are disposed in said connector body, said ferrules extending from said connector body, and said connector assembly further including two shields each of which projects from said connector body to protect an associated ferule from damage.

15. A terminated optical fibers cable, which includes the connector assembly of claim 14, and wherein an optical fiber cable extends through an opening in said cover and enters said connector body at said cable input end of said connector body with optical fiber thereof being terminated by ferrules within said connector body.

16. The terminated optical fiber cable of claim 15, wherein said connector body also includes provisions adjacent to said ferrules for making an electrical connection.

17. The terminated optical fiber cable of claim 15, wherein said cable also includes strength member yarn and said connector body includes means for terminating said yarn to transfer forces applied to the cable to said connector body.

* * * * *